United States Patent [19]
Schreiner

[11] 3,753,299
[45] Aug. 21, 1973

[54] GRATE PLATE FOR GRATES FOR COOLING OR COMBUSTION

[75] Inventor: Paul Schreiner, Papenwisch, Germany

[73] Assignee: Claudius Peters, Aktiengesellschaft, Hamburg, Germany

[22] Filed: Mar. 26, 1971

[21] Appl. No.: 128,371

[30] Foreign Application Priority Data
Mar. 28, 1970 Germany............... P 70 11 510.5
Apr. 30, 1970 Germany............... P 70 16 267.3

[52] U.S. Cl.................... 34/237, 34/163, 110/38
[51] Int. Cl. ................................. F27b 7/38
[58] Field of Search................ 263/32 R; 110/38; 34/164

[56] References Cited
UNITED STATES PATENTS
1,211,755  1/1917  Reagan ............................ 110/38
3,374,553  3/1968  Gillman ............................ 34/164

Primary Examiner—John J. Camby
Attorney—Otto John Munz, Dr. Juris, M.C.L.

[57] ABSTRACT

A grate plate in combination with an apparatus for cooling or combustion having a first zone of a high intense heat and a second area of a lesser heat such as a furnace, rotary furnace or a cooling facility of substantial dimensions for industrial purposes operating with temperature conditions varying from intense heat to moderate temperatures;

said apparatus having means for a directional flow of the material to be moved over said plate, air supply means for combustion or cooling of said material on top of said plate, comprising: a planar body made of heat resisting, heat dissipating rigid metal, means to mount said plate into said apparatus;

a plurality of ribs in relation to the direction of flow of said material on a first area of the upper side of said plate exposed to said high intense heat and perpendicularly to said plate;

said ribs having upper wear surfaces inclined in a direction opposite to the forward direction of travel of said material and orifices in the said first zone of said plate for air supply.

10 Claims, 9 Drawing Figures

Patented Aug. 21, 1973 3,753,299

Patented Aug. 21, 1973
3,753,299
4 Sheets-Sheet 3
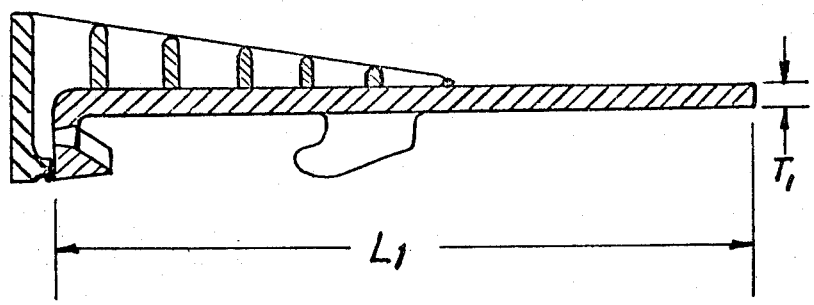
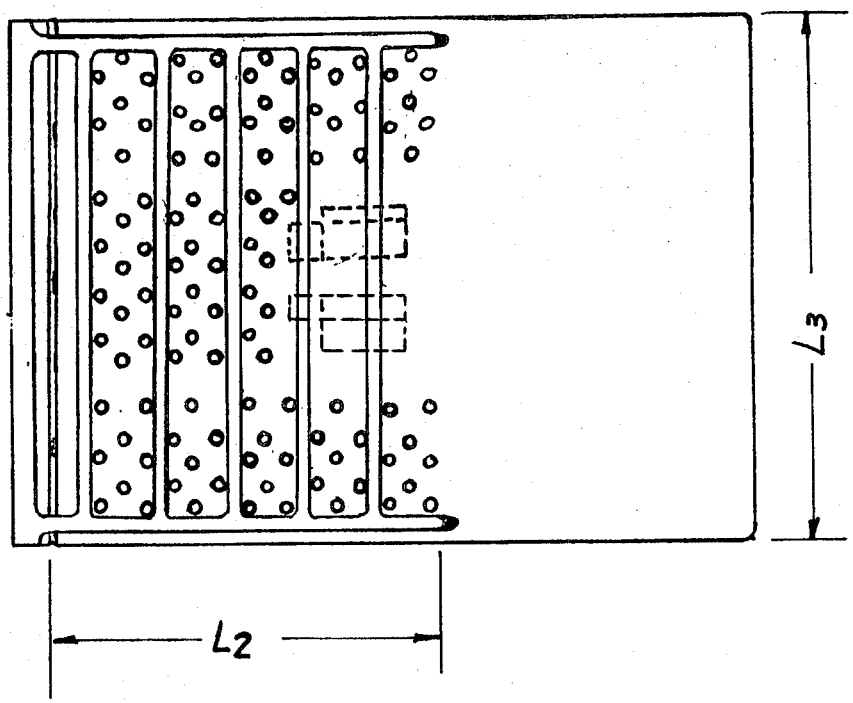
INVENTOR:
PAUL SCHREINER
BY *Otto [signature]*
ATTORNEY Patented Aug. 21, 1973

INVENTOR:
PAUL SCHREINER

BY Otto John Munz.

ATTORNEY

GRATE PLATE FOR GRATES FOR COOLING OR COMBUSTION

CROSSREFERENCE TO A RELATED APPLICATION

Priority of corresponding German applications Nos. Gm 7,011,510 filed Mar. 28, 1970 and Gm 7,016,267 filed Apr. 30, 1970 is claimed under the Convention.

BACKGROUND OF THE INVENTION

1. Filed of the Invention

This invention concerns a grate plate for cooling or combustion grates, and applies especially to angularly and horizontally disposed grates.

2. Description of the Prior Art

Grates for cooling or combustion are generally equipped with interlocking grate plates, of which some are mounted in a fixed position, others are oscillating in a longitudinal direction. The air needed for cooling or combustion is introduced from below through jet like openings to enter, penetrate and pass through the bed of material to be cooled or burned, lying on the grate plate.

The grate plates are subject to wear through mechanical and thermal effects. In the case of cooling grates for instance, which are employed on revolving furnaces for the cooling of hot clinkers from the furnace, the so-called head plate of the grate is subject to considerable mechanical and thermal wear, whereas the rear part of the grate plate is subject to only a minimal wear.

SUMMARY OF THE INVENTION

The objects of the invention are:

To increase the operational life of these grates;

To provide the surface of the grate plate which is subject to the greatest wear with a series of vertical ribs. The height of these ribs and their wear surfaces increase on an incline in the opposite direction of the forward movement of the grate plates, to compensate for the degree of wear on them.

By adding these ribs, according to the invention, the surface area of the grate plate is considerably increased, which in turn increases the thermal dissipation capacity resulting in a protection of the grate plates against overheating. Thus the ribs act as cooling ribs and also considerably increase the strength and rigidity of the grate plates.

When used as a cooling grate for cement clinkers, for instance, particles of the clinkers lodge between the ribs, forming a layer protecting them and the grate plates against excessive thermal wear and also protect them to some degree from mechanical wear.

According to the invention, the ribs may be arranged on the grate plates in a longitudinal or transverse direction, and according to the invention may be integral with the grate base plate.

To avoid the complicated and time consuming removal of only partly worn cooling or combustion grates, it is known to construct the grates of two parts, which may be easily separated, so that the one part subject to greater wear may be easily replaced. It is further known that there are one piece grates on which the head piece can be replaced.

To optionally provide the ribs as a part of the replaceable head part of the grate plate, a grate plate so constructed according to the invention, has not only an advantage by the addition and arrangement of the ribs attached to a separable wear part, but also posesses economic advantages because the base plate may be constructed of a casting material of less heat resistance and less mechanical wear resistance and strength. Only the replaceable wear part, namely the head piece with the ribs need be constructed of heat resistant and wear resistant material.

BRIEF DESCRIPTION OF THE DRAWINGS

Embodiments of the invention are illustrated in the drawings as follows:

FIG. 5 shows in cross section an optional embodiment of the ribs, running transversely to the flow of the material and the movement of the plate;

FIG. 6 is a top view of the embodiment shown in FIG. 5.

Description of the Preferred Embodiments

Figure 1:
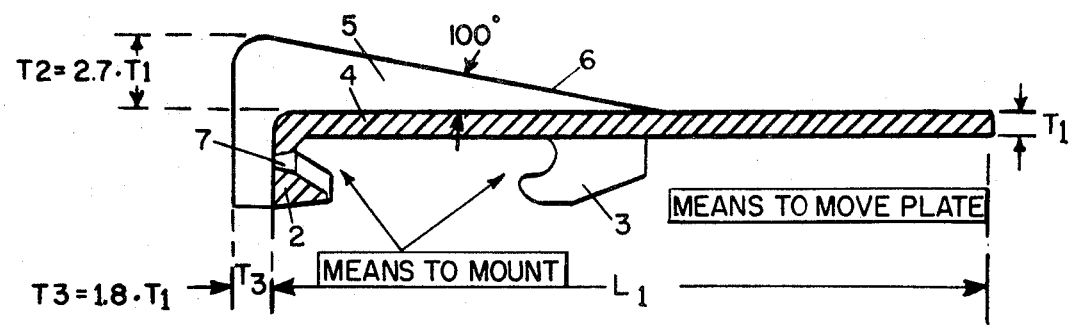
FIG. 1 shows in cross section a flat grate plate with ribs cast integrally with the baseplate.

In a preferred embodiment of the invention of the two piece construction of the grate plate, having a replaceable wear piece, the ribs are integrally connected forwardly with a head rail.

To connect the replaceable wear piece with the base plate at least one of the aforementioned ribs may be provided with a hook like projection fitting into an opening in the base plate. The head rail connected with the ribs is then intermittently spot welded to the front portion of the base. To replace the wear part it is only necessary to cut the spot welded connection, remove the worn out wear part by unhooking it, then hook in a new wear part, spot welding it to the base plate of the grate, thus simply and easily accomplishing the replacement. The head end of the base plate of the grate may be so constructed to provide sufficient cross section to permit repeated welding operations.

Optionally to provide existing worn grate plates, having no opening for a hook with a replaceable wear part, not equipped with a hook. The head rail of the wear plate may be spot welded to the forward part of the base plate of the grate, and at least one of the ribs of the replaceable wear part is spot welded on its free end to the top surface of the base plate of the grate. Such spot welding may also be easily cut when replacing a worn replaceable wear part. In a preferred embodiment of the invention the ribs (5 of FIG. 1) added according to the invention are integral with the base plate 1, where 6 are the wear surfaces of ribs 5. Two hooks 3 at the bottom of the base plate serve for attaching the grate plate to supports which are not shown. A head rail 2 is at right angle and integral with base plate 1. Portion 4 of base plate 1 is subject to intense thermal and mechanical wear. The surfaces of the ribs subject to intense thermal and mechanical wear are continuous and rise on an incline in opposite direction to the forward movement of the grate plate, form a radius at their maximum height and continue at a right angle and parallel to head rail 2, terminating with it. Jet like openings 7 for the introduction of air either for cooling or combustion are arranged in rows in the head rail 2 and portion 4 of the base plate 1.

Figure 2:
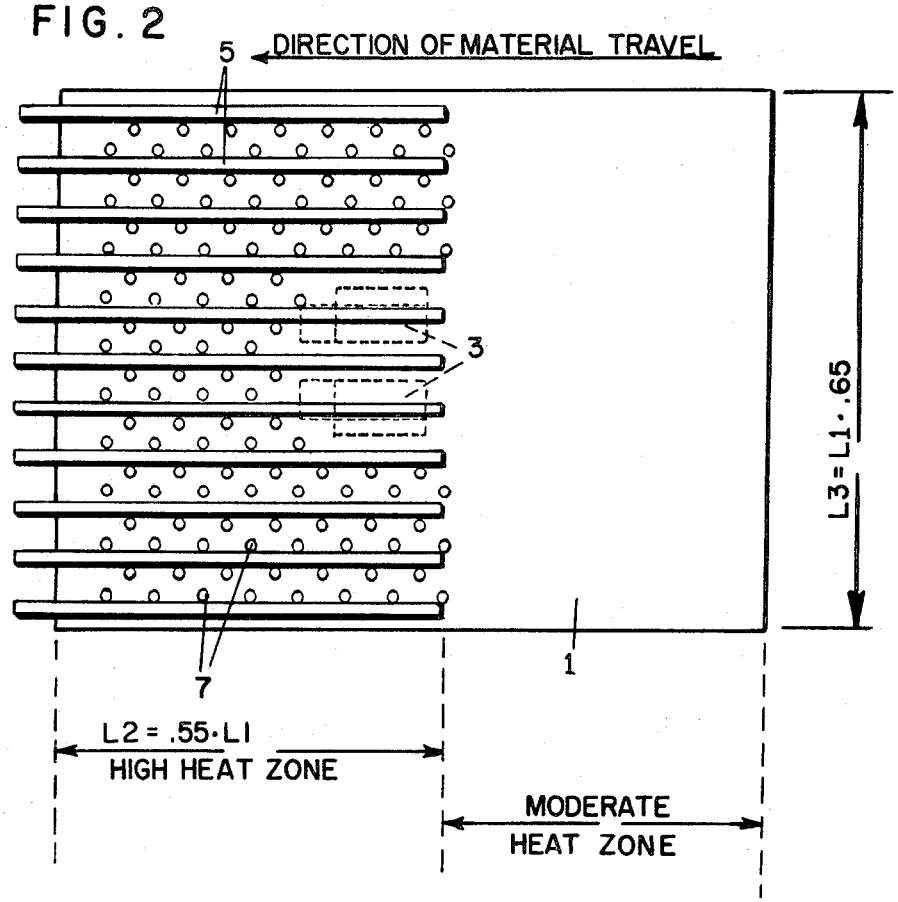
FIG. 2 shows a top view of the same construction as FIG. 1.
Figure 3:
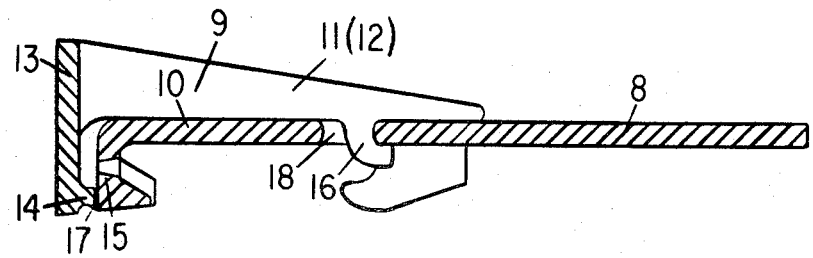
FIG. 3 shows a cross section of a two piece grate with a replaceable wear part.
Figure 4:
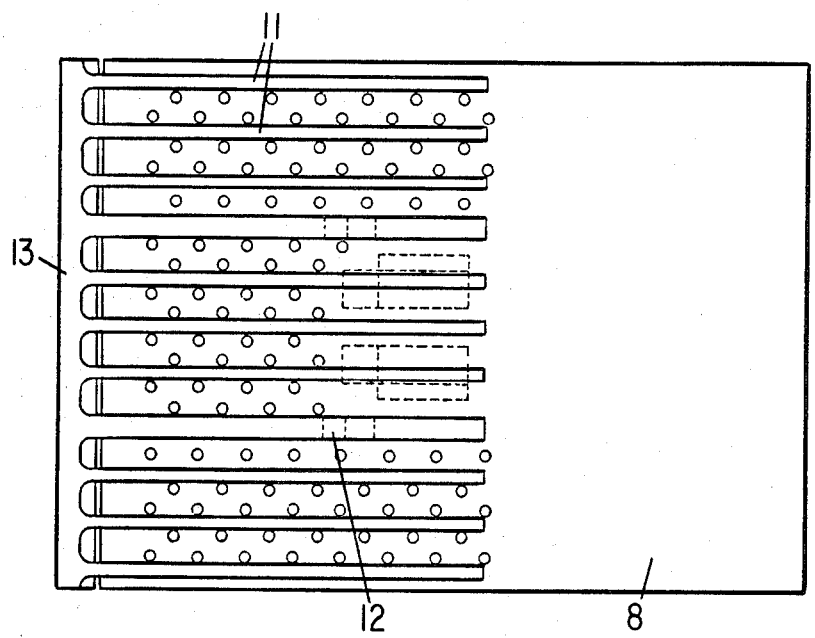
FIG. 4 shows a top view of the same construction as FIG. 3

In another preferred embodiment of the invention illustrated in FIGS. 3 and 4, the grate plate comprises two parts: the base plate 8 and replaceable wear part 9, which is located at the forward end of base plate 8. The wear part 9 comprises ribs 11 and 12, which are integrally connected with a head tail 13. The rib configuration of ribs 11 and 12 are the same as in FIGS. 1 and 2 and extend longitudinally over portion 10 of the base plate 8.

The head rail 13 comprises a rail like projection 14, which maintains the correct distance between the head rail 13 of the replaceable wear part and the forward part 15 of baseplate 8. Assembly and secure connection between the replaceable wear part and the base plate 8 is effected by engaging hooks 16 located on the underside of rib 12 wiht appropriate opening 18 in the base 8.

The hooks 16 contact the rear face of openings 18, while projection 14 contacts the forward part 15 of the base plate 8 and is secured by spot welding. In a variation of this embodiment openings 18 and hooks 16 may be deleted and at least two ribs of the replaceable wear part are spot welded at their extreme ends to the base 8.

In another embodiment shown in FIGS. 5 and 6, the ribs of the replaceable wear part may run transversely to the length of the base plate of the grate plate.

Figure 7:
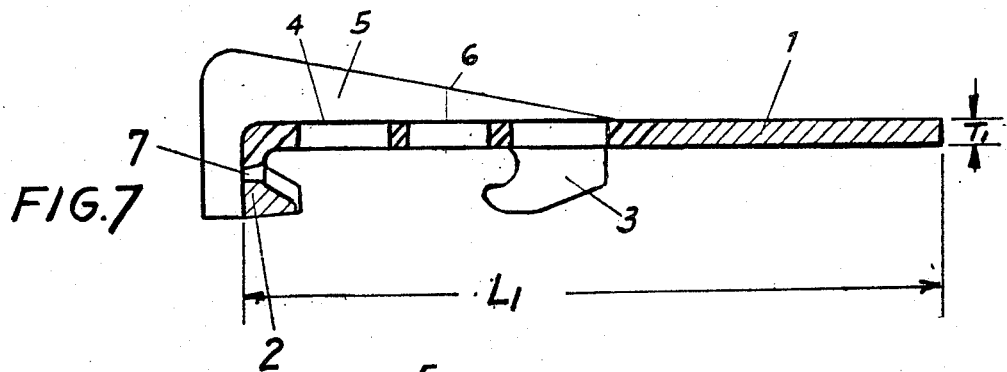
FIG. 7 is a crossectional view of an optional embodiment showing a wedge like construction of the base plate.
Figure 8:
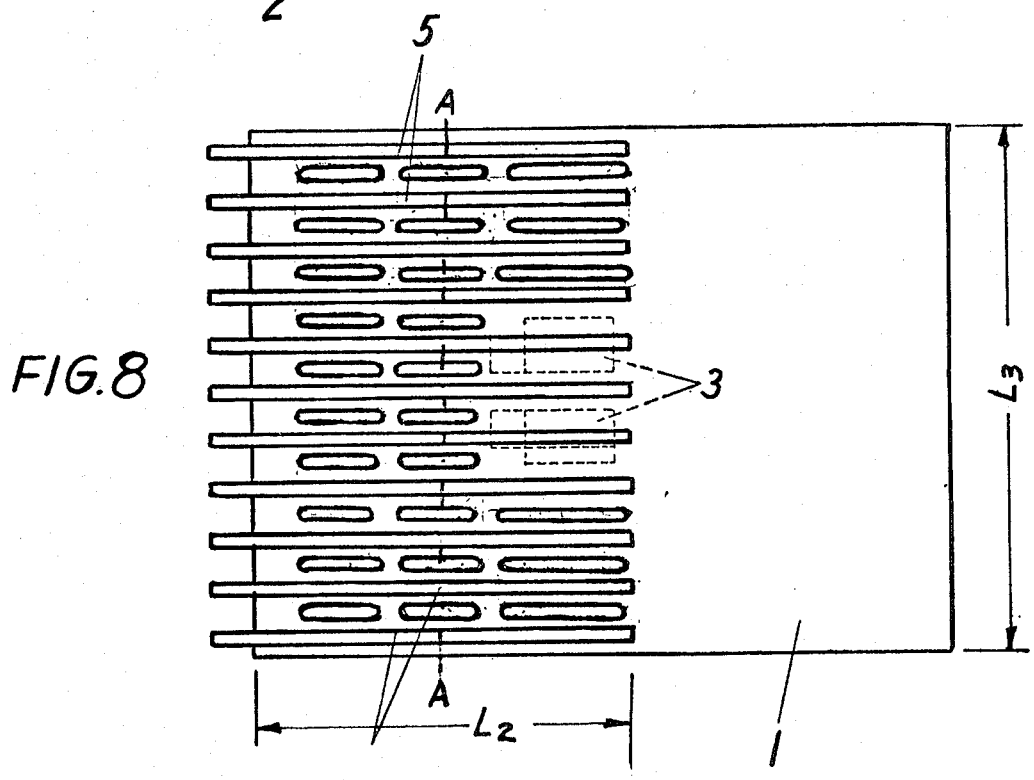
FIG. 8 is a top view of the construction shown in FIG. 7.
Figure 9:
FIG. 9 shows in transverse section the wedge type configuration of the embodiment shown in FIG. 7.

In another embodiment shown in FIGS. 7 to 9, the base plate of the grate plate may be of a wedge shaped configuration.

In FIG. 1 of the drawings the preferred proportional relations of the invention providing optimum results are drawn to scale.

The length L2 of the high heat zone is proportional to the overall length L1 of the plate and is equal to about 0.55 times L.

The length of the rib 6 about equals the length L2 of the high heat zone. The width of the plate L3 equals about L1 times 0.65. The height of the rib 6 at its highest point T2 equals about 2.7 times thickness T1 of the base plate, the angle B of incline of the rib 6 relative to the plate is about 10°. The thickness T3 of the nose of the rib in front of the head piece 2 of the base plate is about 1.8 times T1.

An example of a type of apparatus for which the grate of the invention is usable is a conveyorized grate for a steam boiler, described in the Mechanical Engineer's Handbook, Sixth Edition, McGraw Hill Book Company, pages 9–18, 9–19 and the description thereof is to be included herein by reference.

Another example is a retort or furnace having grates rotating around a vertical axis and called conventionally the "merry-go-round" type. While the reinforcement ribs were shown only in the high heat zone, it is often advantageous to extend them at least partially into the moderate heat zone to avoid long range warping and wear of the latter, because of the continuous variations in contraction and expansion.

I claim:

1. A grate plate in combination with an apparatus for cooling or combustion having a first zone of a high intense heat and a second area of a lesser heat such as a furnace, rotary furnace or a cooling facility, of substantial dimensions for industrial purposes operating with temperature conditions varying from intense heat to moderate temperatures;

said apparatus having means for a directional flow of the material to be moved over said plate, air supply means for combustion or cooling of said material on top of said plate, comprising a planar body made of heat resisting, heat dissipating rigid metal, means to mount said plate, a first area with a plurality of ribs vertically and fixedly arranged in relation to the direction of flow of said material on the upper side of said plate exposed to said high intense heat;

said ribs having upper wear surfaces inclined in the forward direction of travel of said material and orifices in the said first zone of said plate for air supply; and wherein said apparatus includes means to advance said plate against the direction of travel of said material, said ribs having said upper wear surfaces inclined in the direction opposite to the forward direction of said plate.

2. A grate plate as claimed in claim 1, said ribs arranged in the direction transverse to the direction of travel of said plate.

3. A grate plate in combination with an apparatus for cooling or combustion having a first zone of a high intense heat and a second area of a lesser heat such as a furnace, rotary furnace or a cooling facility, of substantial dimensions for industrial purposes operating with temperature conditions varying from intense heat to moderate temperatures;

said apparatus having means for a directional flow of the material to be moved over said plate, air supply means for combustion or cooling of said material on top of said plate, comprising a planar body made of heat resisting, heat dissipating rigid metal, means to mount said plate, a first area with a plurality of ribs vertically and fixedly arranged in relation to the direction of flow of said material on the upper side of said plate exposed to said high intense heat;

said ribs having upper wear surfaces inclined in the forward direction of travel of said material and orifices in the said first zone of said plate for air supply; and including a replaceable wear part, said ribs forming an integral part of said plate.

4. A grate plate in combination with an apparatus for cooling or combustion having a first zone of a high intense heat and a second area of a lesser heat such as a furnace, rotary furnace or a cooling facility, of substantial dimensions for industrial purposes operating with temperature conditions varying from intense heat to moderate temperatures;

said apparatus having means for a directional flow of the material to be moved over said plate, air supply means for combustion or cooling of said material on top of said plate, comprising a planar body made of heat resisting, heat dissipating rigid metal, means to mount said plate, a first area with a plurality of ribs vertically and fixedly arrnaged in relation to the direction of flow of said material on the upper side of of said plate exposed to said high intense heat;

said ribs having upper wear surfaces inclined in the forward direction of travel of said material and orifices in the said first zone of said plate for air supply; and further comprising a replaceable wear part, said ribs arranged in a longitudinal direction of the travel of said plate, and a head rail connecting said ribs with each other in spaced relationship.

5. A grate plate as claimed in claim 4, at least one of said ribs provided at its underside with means to connect said replaceable wear part with said plate, said head rail being integrally fixed with said base plate.

6. A grate plate as claimed in claim 4, said head rail and at least one rib being integrally fixed with said plate.

7. A grate plate as claimed in claim 4, said replaceable wear part being made of a material of a higher heat resistance and wear resistance than the material of said plate.

8. A grate plate in combination with an apparatus for cooling or combustion having a first zone of a high intense heat and a second area of a lesser heat such as a furnace, rotary furnace or a cooling facility, of substantial dimensions for industrial purposes operating with temperature conditions varying from intense heat to moderate temperatures;

said apparatus having means for a directional flow of the material to be moved over said plate, air supply means for combustion or cooling of said material on top of said plate, comprising a planar body made of heat resisting, heat dissipating rigid metal, means to mount said plate, a first area with a plurality of ribs vertically and fixedly arranged in relation to the direction of flow of said material on the upper side of said plate exposed to said high intense heat;

said ribs having upper wear surfaces inclined in the forward direction of travel of said material and orifices in the said first zone of said plate for air supply; and each said rib provided with a frontal extension covering the head portion of said base, the height of said rib being at the highest point of its inclination equal about 2.7 times the thickness T1 of said plate, the angle of said inclination being about 10° relative to the top surface of said plate.

9. A grate plate in combination with an apparatus for cooling or combustion having a first zone of a high intense heat and a second area of a lesser heat such as a furnace, rotary furnace or a cooling facility, of substantial dimensions for industrial purposes operating with temperature conditions varying from intense heat to moderate temperatures;

said apparatus having means for a directional flow of the material to be moved over said plate, air supply means for combustion or cooling of said material on top of said plate, comprising a planar body made of heat resisting, heat dissipating rigid metal, means to mount said plate, a first area with a plurality of ribs vertically and fixedly arranged in relation to the direction of flow of said material on the upper side of said plate exposed to said high intense heat;

said ribs having upper wear surfaces inclined in the forward direction of travel of said material and orifices in the said first zone of said plate for air supply; and the length of said high heat zone L2 being equal about 0.55 times the length L1 of said plate.

10. A grate plate in combination with a grate in an apparatus for heat exchange treatment of materials, in at least two heat zones of different temperatures, a plurality of grate plates, fixed plates and moving plates for conveying said material from one said heat zone through said other heat zone;

means to mount each one said fixed plate adjacent to one said moving plate;

means to move said moving plates against the direction of travel of said material;

each said plate provided on its upper flat side, in the area exposed to high thermal mechanical wear, with a plurality of vertical elongated ribs, the upper surfaces of said ribs in the areas exposed to high wear aligned in a plane inclined in the direction opposite to the forward movements of said moving plates, whereby said material is forwarded from said heat zone through the other said heat zone.

* * * * *